US012763647B2

(12) United States Patent
Long et al.

(10) Patent No.: US 12,763,647 B2
(45) Date of Patent: Oct. 13, 2026

(54) ELECTRIC DRIVE SYSTEMS WITH INTEGRATED BUS BAR AND INTER-HOUSING BARRIER FOR WORK VEHICLES

(71) Applicant: Deere & Company, Moline, IL (US)

(72) Inventors: Randall L. Long, Coffeyville, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 259 days.

(21) Appl. No.: 18/758,137

(22) Filed: Jun. 28, 2024

(65) Prior Publication Data

US 2026/0005585 A1 Jan. 1, 2026

(51) Int. Cl.

*H02K 11/33* (2016.01)
*B60K 6/405* (2007.10)
*H02K 5/22* (2006.01)

(52) U.S. Cl.

CPC .............. *H02K 11/33* (2016.01); *B60K 6/405* (2013.01); *H02K 5/225* (2013.01); *B60Y 2200/41* (2013.01); *B60Y 2400/61* (2013.01)

(58) Field of Classification Search

CPC .......... H02K 11/33; H02K 5/10; H02K 5/225; H02K 9/19

See application file for complete search history.

(56) References Cited

U.S. PATENT DOCUMENTS

| | | | | |
|---|---|---|---|---|
| 10,259,310 B2 * | 4/2019 | Agata | ...................... | H02K 5/20 |
| 2018/0290530 A1 * | 10/2018 | Chai | ...................... | B60K 1/00 |
| 2018/0304835 A1 * | 10/2018 | Skalski | ...................... | H02K 5/225 |
| 2023/0412039 A1 * | 12/2023 | Deng | ...................... | H02K 5/225 |
| 2025/0262922 A1 * | 8/2025 | Ling | ...................... | B60K 1/00 |

FOREIGN PATENT DOCUMENTS

| | | | |
|---|---|---|---|
| EP | 4461576 A2 * | 11/2024 | ............ F01M 5/002 |
| WO | WO2017054687 A1 | 4/2017 | |

OTHER PUBLICATIONS

EP-4461576-A2 Machine Translation (Year: 2024).*

FEV, Battery Electric Vehicle Transmission article excerpt, https://www.fev.com/en/magazine/en/battery-electric-vehicle-transmission/, undated admitted prior art (1 page).

* cited by examiner

*Primary Examiner* — Oluseye Iwarere
*Assistant Examiner* — Masoud Vaziri
(74) *Attorney, Agent, or Firm* — KLINTWORTH & ROZENBLAT LLP

(57) ABSTRACT

The present disclosure pertains to an electric drive system designed for a work vehicle. The system includes an electric machine and an inverter for providing power and controlling the vehicle's drive functions. A feature of this system is the integration of a bus bar, which electrically connects the electric machine's first electrical conductor to the inverter's second electrical conductor. This connection facilitates efficient power transmission across the system. Notably, the bus bar has ends that securely couple to the respective conductors housed within separate enclosures. An inter-housing barrier is situated between these enclosures and encloses a segment of the bus bar and is designed to offer a fluid-tight seal. This seal prevents any fluid transfer between the two enclosures.

16 Claims, 11 Drawing Sheets

ELECTRIC DRIVE SYSTEMS WITH INTEGRATED BUS BAR AND INTER-HOUSING BARRIER FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to electric drive systems for work vehicles, and specifically, to an electric drive system with an integrated bus bar and inter-housing 9 barrier.

BACKGROUND OF THE DISCLOSURE

The shift towards vehicle electrification presents significant engineering challenges, particularly in optimizing the integration of electrical components to achieve seamless and efficient performance. High voltage connectors, such as cables, which are used in the operation of electric vehicles (EVs) are a bottleneck in system performance. These connectors can restrict the flow of power between components, such as the inverter and the electric machine (E-machine), thereby limiting the overall efficiency of the vehicle.

Traditionally, to mitigate the limitations imposed by high-voltage connectors, bus bars have been employed. These allow for a more direct and efficient transfer of power. However, integrating bus bars effectively requires that the inverter and the e-machine be located within the same housing. While this arrangement enhances efficiency by reducing connection points and power losses, it introduces significant complications in terms of maintenance and serviceability.

Specifically, when inverters are integrated within the transmission system, accessing them for maintenance or repair usually necessitates extensive disassembly or complete removal of the transmission. This requirement for significant disassembly not only increases the complexity and cost of maintenance but also extends vehicle downtime, which is less than ideal in commercial usage scenarios where operational reliability and quick servicing are critical.

Moreover, the operational environment within an EV's transmission system exposes components to significant thermal cycling due to variations in load and ambient conditions. This thermal cycling causes expansion and contraction in the bus bars, which should be accommodated to avoid mechanical stresses that could lead to fatigue and failure. Ensuring the integrity of these components while maintaining the system's efficiency poses additional design challenges.

SUMMARY OF THE DISCLOSURE

Electric drive systems with integrated bus bars and inter-housing barriers for work vehicles are disclosed. In various embodiments, the present disclosure includes an electric drive system for a work vehicle. The electric drive system also includes an electric machine of the electric drive system; an inverter for providing power to the electric machine of the electric drive system; a bus bar electrically coupling a first electrical conductor of the electric machine to a second electrical conductor of the inverter, where the bus bar has a first end coupled to the first electrical conductor and a second end coupled to the second electrical conductor, the first electrical conductor located within a first enclosure and the inverter located within a second enclosure; and an inter-housing barrier positioned between the first enclosure and the second enclosure, where the inter-housing barrier surrounds a segment of the bus bar and is configured to provide a fluid-tight seal that prevents fluid transfer between the first and second enclosures.

Implementations may include one or more of the following features. The electric drive system where the first enclosure includes a first fluid and the second enclosure includes a second fluid, the first fluid and the second fluid being immiscible. The electric drive system may include a liquid polymer that is injected between the inter-housing barrier and the bus bar.

The electric drive system may include a gasket that seals the bus bar from environmental exposure and prevents fluid transfer between the first enclosure and the second enclosure. The inter-housing barrier includes a flange that abuts an aperture of the second enclosure and an engagement interface that is inserted into an aperture of the first enclosure.

The electric drive system may include a first enclosure gasket positioned between the engagement interface and the aperture of the first enclosure and a second enclosure gasket interposed between the flange of the inter-housing barrier and the aperture of the second enclosure. The flange is configured to be secured to the first or second enclosure. The inter-housing barrier is a plug having a stop and a neck, where the neck is configured to be inserted into an aperture of either the first or second enclosure and the stop is placed against the first or second enclosure.

The electric drive system may include a gasket disposed on the neck, the gasket preventing fluid transfer between the first and second enclosures. Implementations of the described techniques may include hardware, a method or process, or computer software on a computer-accessible medium.

One general aspect includes a work vehicle having an electric drive system, the work vehicle comprising: an electric machine housed within a first enclosure containing a first fluid, the electric machine including first electrical conductors: an inverter externally mounted relative to the electric machine and housed within a second enclosure containing a second fluid, the inverter including second electrical conductors; and a bus bar assembly comprising: (i) bus bars electrically coupling the first electrical conductors of the electric machine to the second electrical conductors of the inverter; and inter-housing barriers positioned between the first enclosure and the second enclosure, wherein the inter-housing barriers surround a segment of each of the bus bars and provide a fluid-tight seal preventing transfer of the first fluid into the second enclosure and the second fluid into the first enclosure.

Implementations may include one or more of the following features. The work vehicle where the electric machine is integrated within a transmission housing containing a transmission fluid as the first fluid and the inverter is housed within a second enclosure containing water as a cooling fluid, where the inter-housing barrier provides a sealing interface that prevents the transmission fluid from mixing with the water. The inter-housing barriers each include a flange that abuts an aperture of the second enclosure and an engagement interface that is inserted into an aperture of the first enclosure.

The work vehicle may include first enclosure gaskets positioned between engagement interfaces of the inter-housing barriers and the apertures of the first enclosure, and second enclosure gaskets interposed between each of the flanges of the inter-housing barriers and the apertures of the second enclosure. The flange is configured to be secured to the first or second enclosure.

The engagement interfaces surround, without contacting, the bus bars and a liquid polymer that is injected inside voids between the engagement interfaces and the bus bars, to allow the bus bars to expand and contract without compromising the fluid-tight seal. The first enclosure includes a first fluid and the second enclosure includes a second fluid, the first fluid and the second fluid being immiscible.

The inter-housing barriers are constructed from a high-temperature-resistant material capable of elastic deformation. The inter-housing barriers may include a plurality of plugs each being associated with one of the bus bars, each of the plugs having a stop and a neck, the neck is configured to be inserted into an aperture of either the first or second enclosure, and the stop abuts the first or second enclosure.

The work vehicle may include a gasket disposed on the neck, the gasket preventing fluid transfer between the first and second enclosures.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
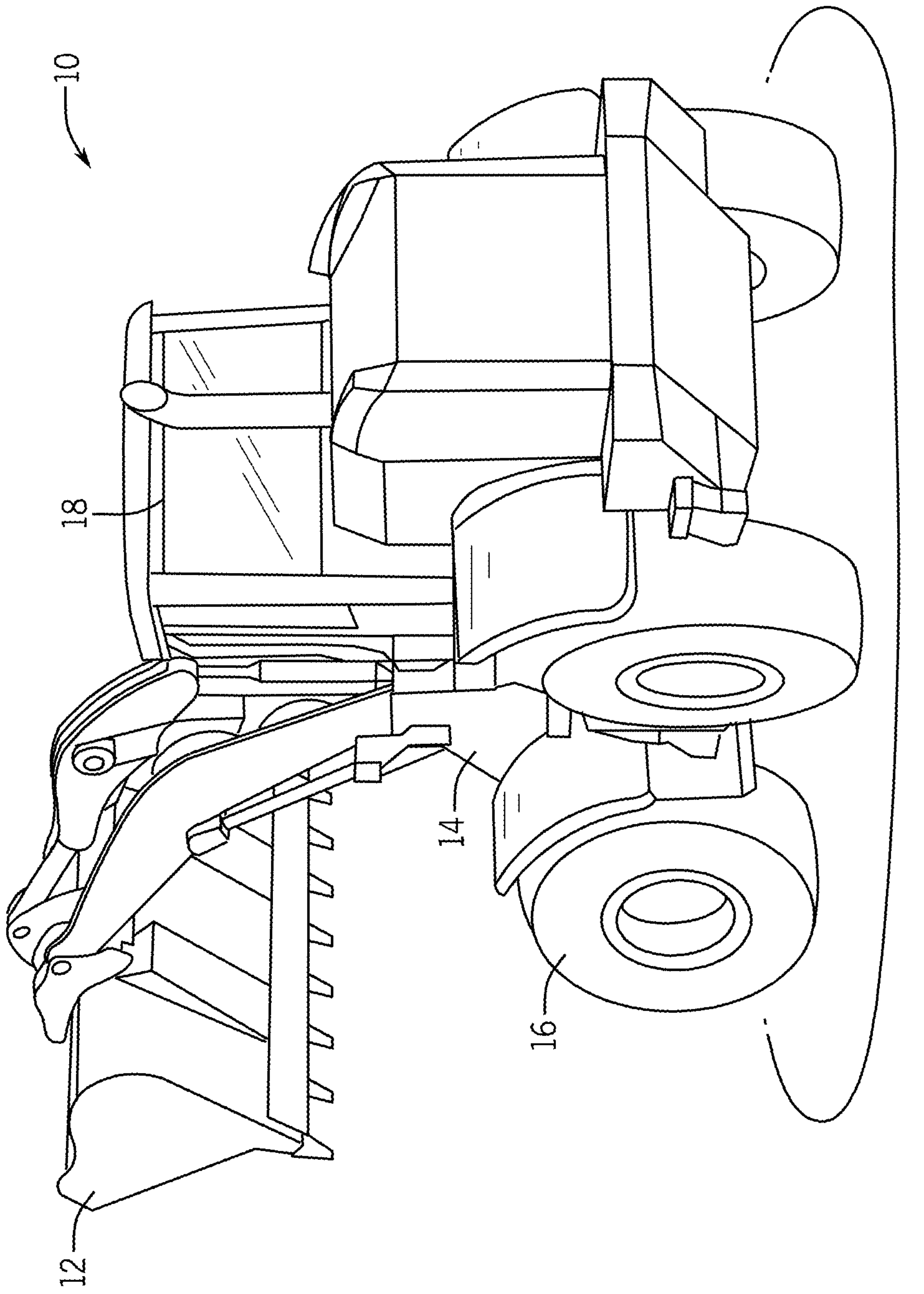
FIG. 1 is a perspective view of an example work vehicle that can be used to implement embodiments of the present disclosure.

Like reference symbols in the various drawings indicate like elements. For simplicity and clarity of illustration, descriptions, and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying FIGS. of the drawings described briefly above. Various modifications to the example embodiments may be contemplated by one of skill in the art without departing from the scope of the present invention, as set forth in the appended claims.

OVERVIEW

The present disclosure pertains to solutions that address challenges inherent in the integration and serviceability of power transmission components in work vehicles, specifically focusing on electric drive systems, that incorporate an inverter and an electric machine (e-machine). One goal of the present technology is to improve efficiency and ease of maintenance without requiring extensive disassembly or complete removal of the transmission system, which is a common drawback in current designs.

To achieve this, the present technology includes a placement strategy for the inverter, allowing the inverter to remain external to the main housing of the transmission (or other similar work vehicle components that would be electrically coupled to an inverter). This strategic placement facilitates easier access for maintenance and repair activities, reducing the labor and downtime typically associated with such tasks. By keeping the inverter external, an example electric drive system avoids the problem in which servicing the inverter requires invasive procedures that time-consuming and costly.

Further enhancing the practicality of the disclosed electric drive systems, is the incorporation of flexible bus bars that connect the inverter and the e-machine. These bus bars are designed to accommodate thermal expansion and contraction, which are prevalent in harsh operational environments. This flexibility helps in mitigating mechanical stresses that often lead to fatigue and eventual failure of rigid components. The design ensures that electrical efficiency is not compromised, maintaining optimal conductivity and minimizing power loss across connections.

Additionally, the electric drive systems include a sealing mechanism, referred to as an inter-housing barrier, manufactured from gasket materials that prevent the ingress or egress of fluids into (or out from) the inverter. The inter-housing barrier is used for protecting sensitive electric components from the harsh external environment typical within the transmission housing, which often includes exposure to oils and other fluids. This inter-housing barrier not only enhances the durability of the electric components but also ensures consistent performance by preventing contamination.

By addressing the challenges of efficiency and serviceability, the systems of the present disclosure enable more reliable and user-friendly technologies. This approach not only benefits vehicle manufacturers by reducing warranty and service costs but also enhances the user experience by increasing the reliability and operational uptime of work vehicles.

Accordingly, the following description should be understood as merely providing a non-limiting example context in which embodiments of the present disclosure may be better understood.

Example Electric Drive Systems with Integrated Bus Bar and Inter-Housing Barrier for Work Vehicles Referring to FIG. 1, an example work vehicle 10 in the form of a self-propelled vehicle (e.g., a wheel loader) houses or otherwise supports a bucket 12 attached to an articulating arm. The work vehicle 10 may be either a manned or autonomous vehicle.

As is known, the bucket 12 may be primarily implemented to scoop or distribute material of any kind. Generally, the work vehicle 10 may include a vehicle frame or chassis 14 that is supported off the by ground engaging members 16 (e.g., wheels or tracks) and which supports a cab 18.

Figure 2:
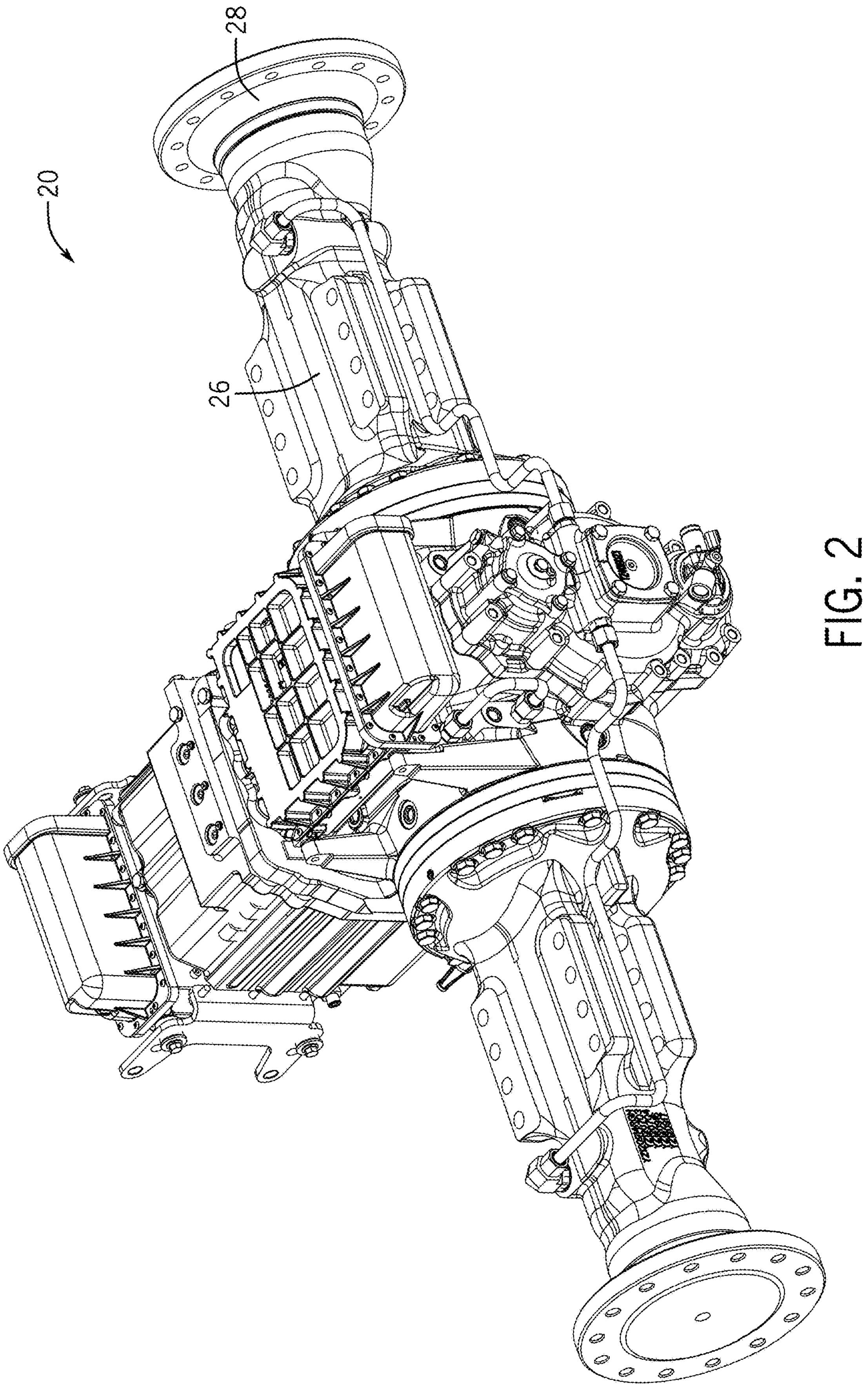
FIG. 2 is a perspective view of an example electric drive system that can be used in the example work vehicle of FIG. 1.
Figure 3:
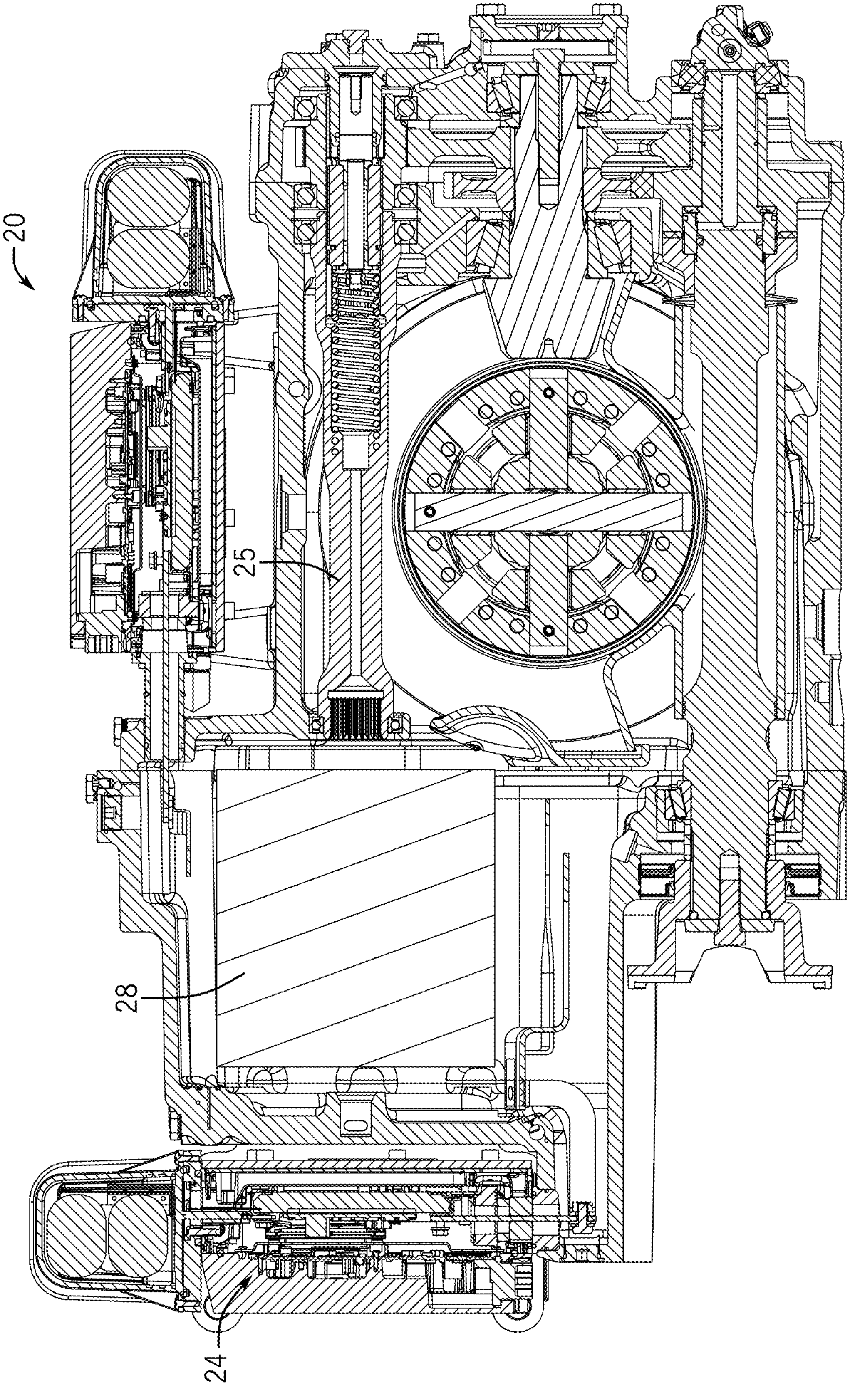
FIG. 3 is a partial, cross-sectional view of an example electric drive system, showing an e-machine and inverter.

Referring now to FIGS. 2 and 3 collectively which illustrate an example electric drive system 20 for use in the work vehicle of FIG. 1. The electric drive system 20 can 11 include an electric machine (hereinafter "e-machine 22"), an inverter 24, a transmission assembly 26, and driveline components 28. While a particular configuration of an electric drive system components has been shown, the present disclosure is not so limited.

The e-machine 22 can include an electric motor, in some embodiments. In hybrid and electric work vehicles, the e-machine functions as an electric motor, providing direct propulsion power by converting electrical energy into mechanical energy. In some hybrid configurations, the e-machine 22 can operate as a generator by converting mechanical energy (often from the vehicle's motion or internal combustion engine) back into electrical energy, which is then used to recharge a set 21 of batteries. In other hybrid systems, the e-machine 22 can switch between motor and generator modes. The design might integrate this component closely with the transmission to optimize power transfer and efficiency, both in generating electrical power and in using it for propulsion. In this example, the e-machine 22 is coupled to a shaft 25 that provides rotational force to components of the transmission assembly 26.

The inverter 24 provides power to the e-machine 22 of the electric drive system 20. The inverter 24 is positioned external to the e-machine 22 to optimize both accessibility and thermal management. The location of the inverter 24 ensures that maintenance or diagnostic checks can be performed with greater ease compared to more traditional, less accessible configurations. This externally mounted approach also aids in heat dissipation, leveraging the natural thermal gradient to keep the inverter 24 cooler during operation. 2

The close proximity of the inverter 24 to other components, such as the e-machine 22 and other parts of the electric drive system 20, minimizes the length of electrical connections therebetween. Shorter connections not only reduce potential energy losses but also enhance the overall efficiency and reliability of the electric drive system 20.

The transmission assembly 26 is a component of the vehicle's powertrain, designed to transmit power generated by the e-machine 22 to the ground engaging members 16 (see FIG. 1). The transmission assembly 26 houses various gears and clutches that adjust the torque and speed ratios between the e-machine 22 and the drivetrain. Driveline components 28 encompass parts that transfer power from the transmission to the ground engaging members 16 of the work vehicle 10, which can include drive shafts, differentials, and axles. 14

Figure 4:
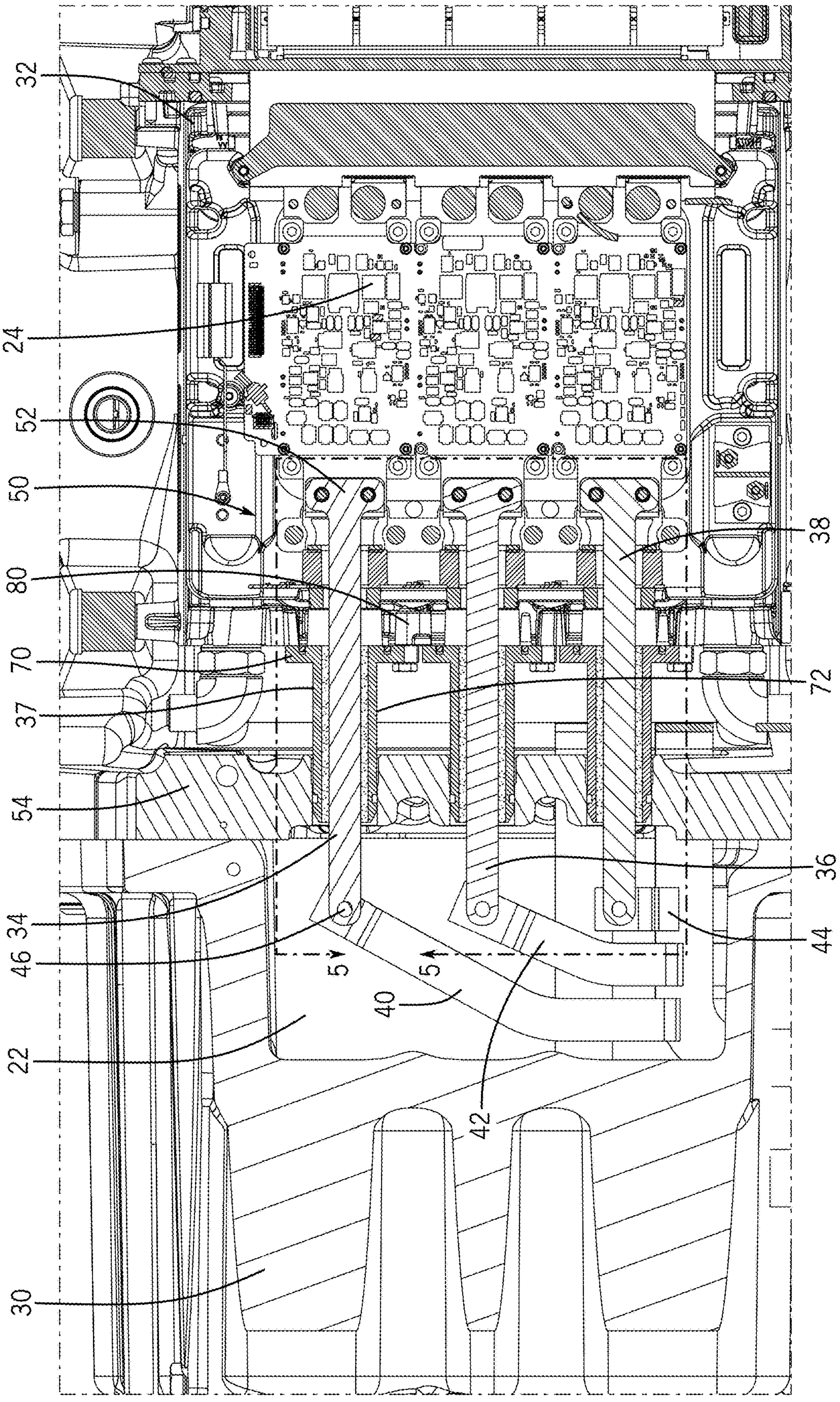
FIG. 4 is a cross-sectional view of an inter-housing barrier for protecting and securing a bus bar spanning between an e-machine and inverter.

Referring now to FIG. 4, which is a cross-sectional view of another example electric drive system 20 that illustrates the inverter 24 and the e-machine 22 in another configuration and orientation. In this example, the e-machine 22 is positioned inside a first enclosure 30 and the inverter 24 is located in a second enclosure 32. A bus bar 34 electrically couples the e-machine 22 to the inverter 24.

An inter-housing barrier 37 is positioned between the first enclosure 30 and the second enclosure 32. The inter-housing barrier 37 surrounds a segment of the bus bar 34 and is configured to provide a fluid-tight seal that prevents fluid transfer between the first and second enclosures 30 and 32. The inter-housing barrier 37 is preferably manufactured from a durable, heat-resistant, and electrically insulating material such as polytetrafluoroethylene (PTFE), known for chemical resistance and wide operating temperature range. Polyimide can also be used as it has thermal stability and mechanical and electrical insulation capabilities. The materials selected should be able to withstand harsh operating conditions while maintaining structural integrity and performance. While these are example materials, other materials known by one of ordinary skill in the art can also be used.

In the electric drive system 20, each of the first and second enclosures 30 and are designed to enhance the functionality and safety of the components housed through the use of fluids, which may or may not be immiscible depending on the specific requirements of the electric drive system 20.

For example, the first enclosure 30 contains the e-machine 22 and is filled with a fluid selected for its electrical insulating properties. This fluid protects the e-machine 22 from electrical hazards, enhances its operational stability, and may contribute to cooling as well. The fluid selected for the first enclosure 30 is based on the fluid's ability to insulate electrically while assisting in thermal regulation and depends on the operational demands placed on the e-machine 22. In some instances, the fluid is a transmission fluid or oil. 11

The second enclosure 32, which houses the inverter 24, is filled with a fluid chosen according to thermal management properties. This fluid effectively dissipates the heat generated by the inverter 24 (and bus bar 34) during the conversion of DC power to AC power. Efficient cooling of the inverter 24 prevents overheating, ensuring reliability and longevity of the electric drive system 20. The choice of fluid in the second enclosure 32 may depend on cooling efficiency and compatibility with the inverter's materials. 18

The choice of whether the fluids in the first and second enclosures 30 and 32 are immiscible depends on the design of the electric drive system 20 and specific operational requirements. Immiscible fluids can be advantageous if there is a need to prevent mixing in scenarios where leakage or breaching of internal barriers might occur. However, in systems where such separation is not critical, using miscible fluids that can still meet the distinct requirements of cooling and insulation is preferable. This allows for more flexibility in fluid selection and system design, potentially reducing costs and simplifying maintenance. However, in either instance, the inter-housing barrier 37 provides a watertight seal between the first enclosure 30 and the second enclosure 32.

Figure 5:
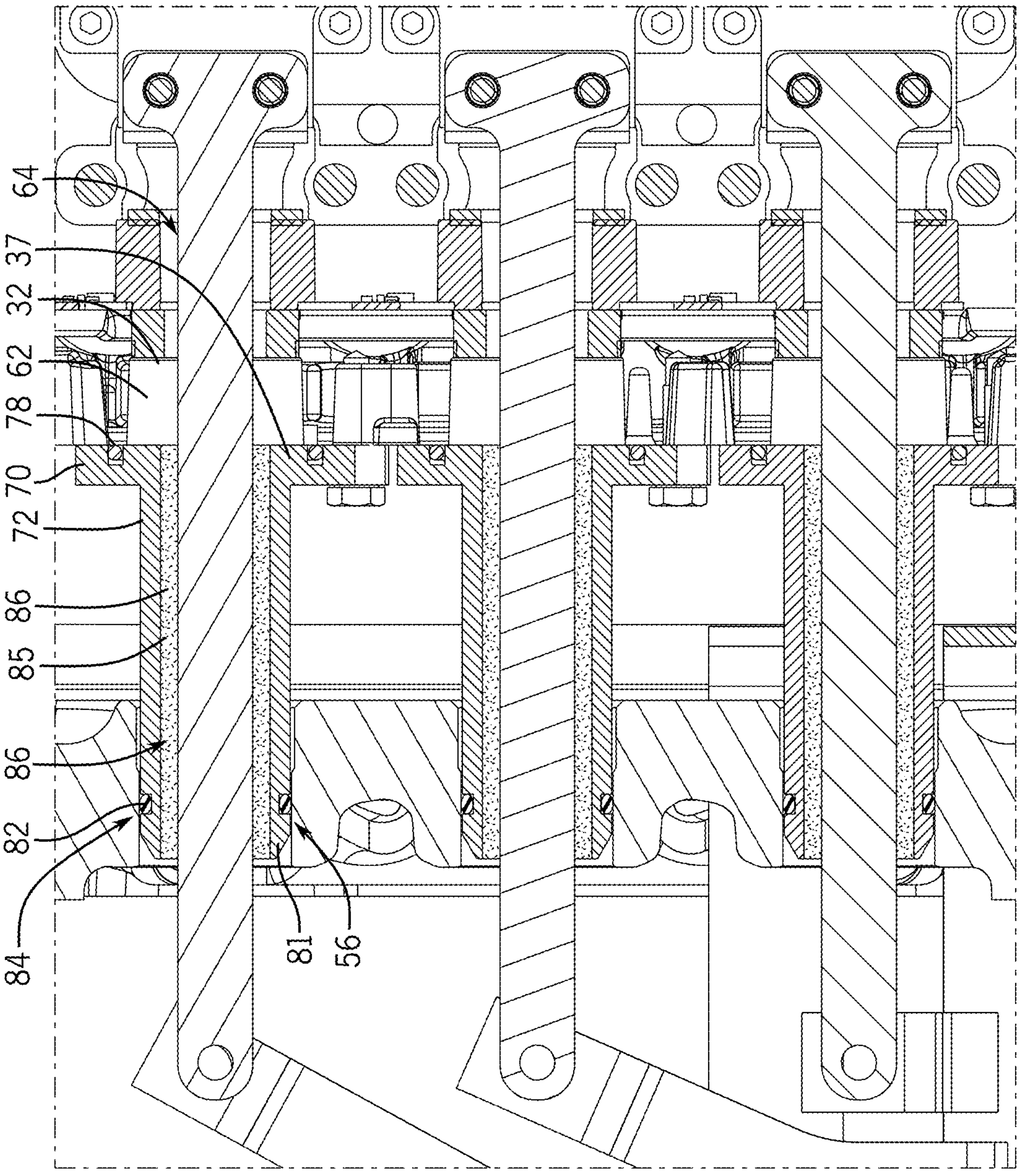
FIG. 5 is a close-up view of the inter-housing barrier.

In FIGS. 4 and 5, the first enclosure 30 and second enclosure 32 are shown in cross-section exposing electrical components of the inverter 24 and the e-machine 22. In one configuration, the e-machine 22 and inverter 24 are electrically coupled using three bus bars 34, 36, and 38. Each of the bus bars 34, 36, and 38 can be associated with an inter-housing barrier.

While the illustrated embodiment includes three bus bars, one of ordinary skill in the art will appreciate that fewer or more bus bars can be included. Additionally, the number of inter-housing barriers can change correspondingly as the number of bus bars changes. 6

With respect to the e-machine 22, the bus bars can be connected indirectly to the e-machine 22 via additional bus bars 40, 42, and 44. The additional bus bars 40, 42, and 44 act as electrical conductors for the e-machine 22. That is, the additional bus bars 40, 42, and 44 couple directly to the e-machine 22 on one end and to the bus bars 34, 36, and 38 on another, opposing end. 11

The bus bars are designed to be thin and, in some instances, rectangular in shape. This specific form is chosen, in some embodiments, to mitigate the skin effect, a phenomenon that occurs at higher frequencies where eddy currents reduce the effective area of the conductor that can carry current. By maintaining a minimal thickness, the bus bars ensure that the skin effect does not compromise current-carrying capacity. To be sure, the shape and thickness of each bus bar can vary along a length of the bus bar. For example, a bus bar can include a straight, thin cross-section along the entire length, whereas in other embodiments, the bus bar can include twists, cambering, or other irregularities along a length of the bus bar.

Additionally, the bus bars are engineered to accommodate thermal expansion and contraction, an important feature given the temperature variations the bus bars 22 may undergo during operation. The flexibility of the bus bars acts to prevent mechanical strains that could lead to structural failures at connection points or within the bus bars themselves.

Integration of the bus bars within the electric drive system 20 of the work vehicle 10 is designed to optimize electrical efficiency and component compactness. The bus bars are used in place of cables to minimize power losses and lower manufacturing costs. As will be discussed in greater detail below, the bus bars are part of an assembly that includes sealing and isolation techniques. These techniques involve the use of polymers or other insulating materials that ensure electrical isolation and enhance the physical stability of the assembly. These elements not only support the bus bars in handling high currents safely but also secure them against electrical shorts and other potential failures. 3

In general, a bus bar electrically couples an electrical conductor of the e-machine 22 to an electrical conductor of the inverter 24. In one example, the bus bar 34 has a first end 46 coupled to a first electrical conductor (which in this instance includes bus bar 40) and a second end 50 can be coupled to a second electrical conductor 52. As noted above, the first electrical conductor is located within the first enclosure 30 and the inverter 24 located within the second enclosure 32.

In some instances, the first enclosure 30 includes a sidewall 54 that includes apertures, such as aperture 56, which provide access for the bus bars to connect with the e-machine 22. Similarly, the second enclosure 32 includes a sidewall 62 that includes apertures, such as aperture 64 that each provide access for the bus bars 34, 36, and 38 to connect with the inverter 24.

Figure 6A:
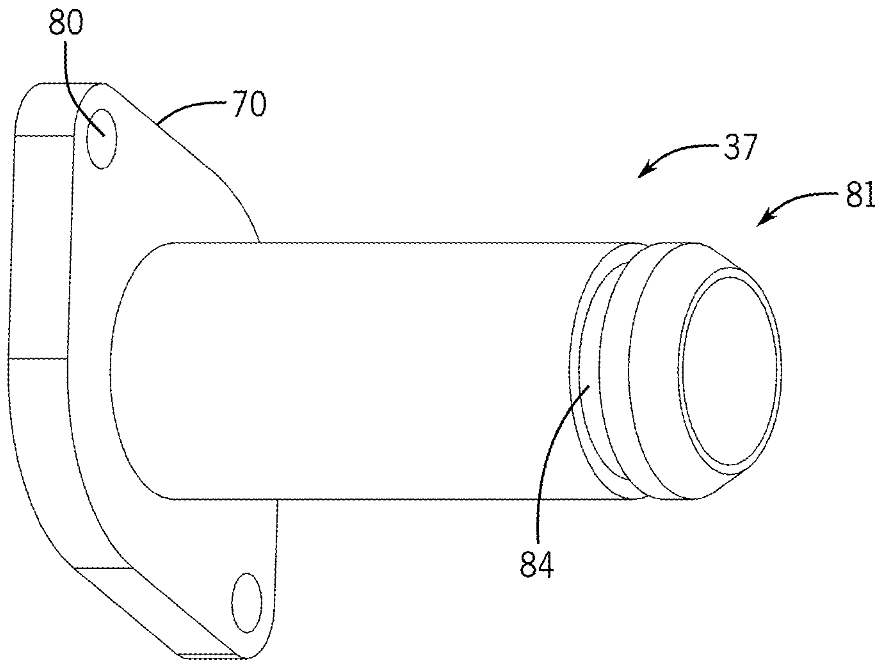
FIGS. 6A and 6B are perspective views of the inter-housing barrier.
Figure 6B:
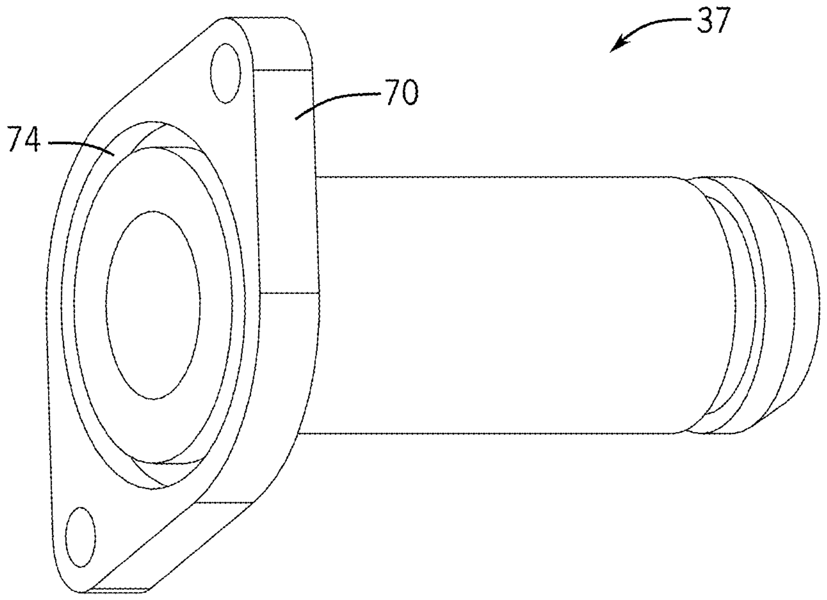
Figure 7:
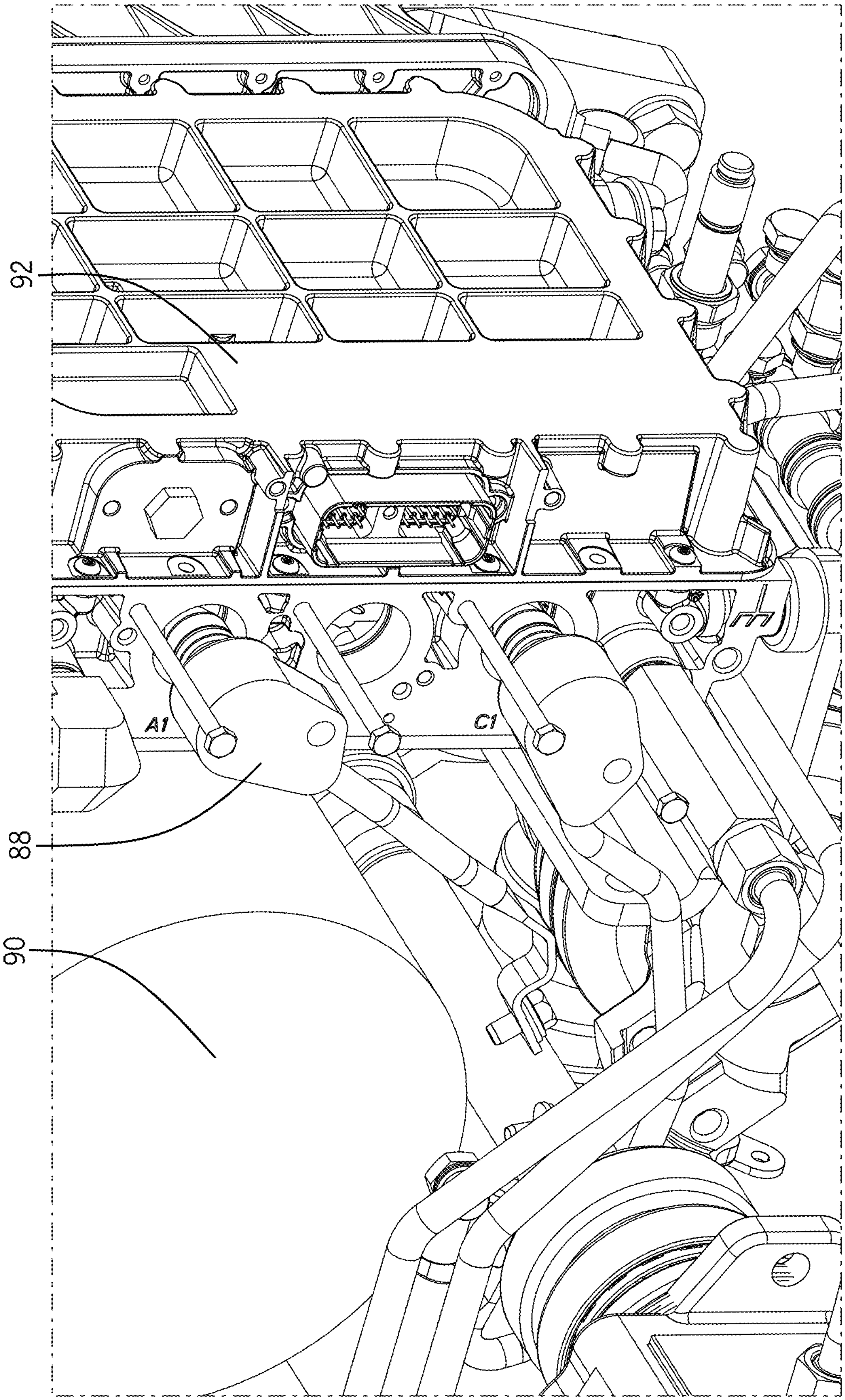
FIG. 7 is a perspective view of another example inter-housing barrier for protecting and securing a bus bar spanning between an e-machine and inverter.
Figure 8:
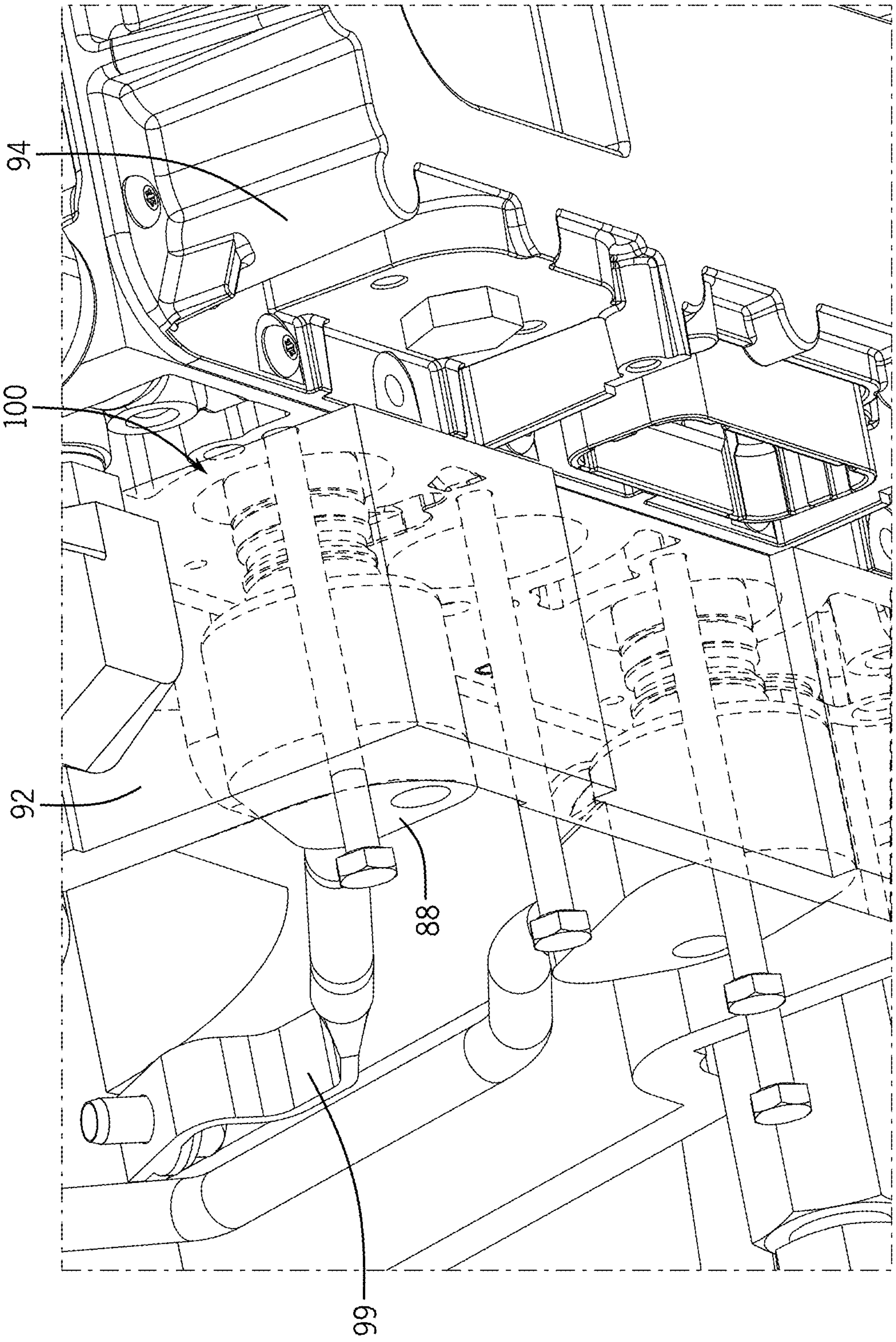
FIG. 8 is a perspective view of the inter-housing barrier between a first enclosure and a second enclosure.
Figure 9:
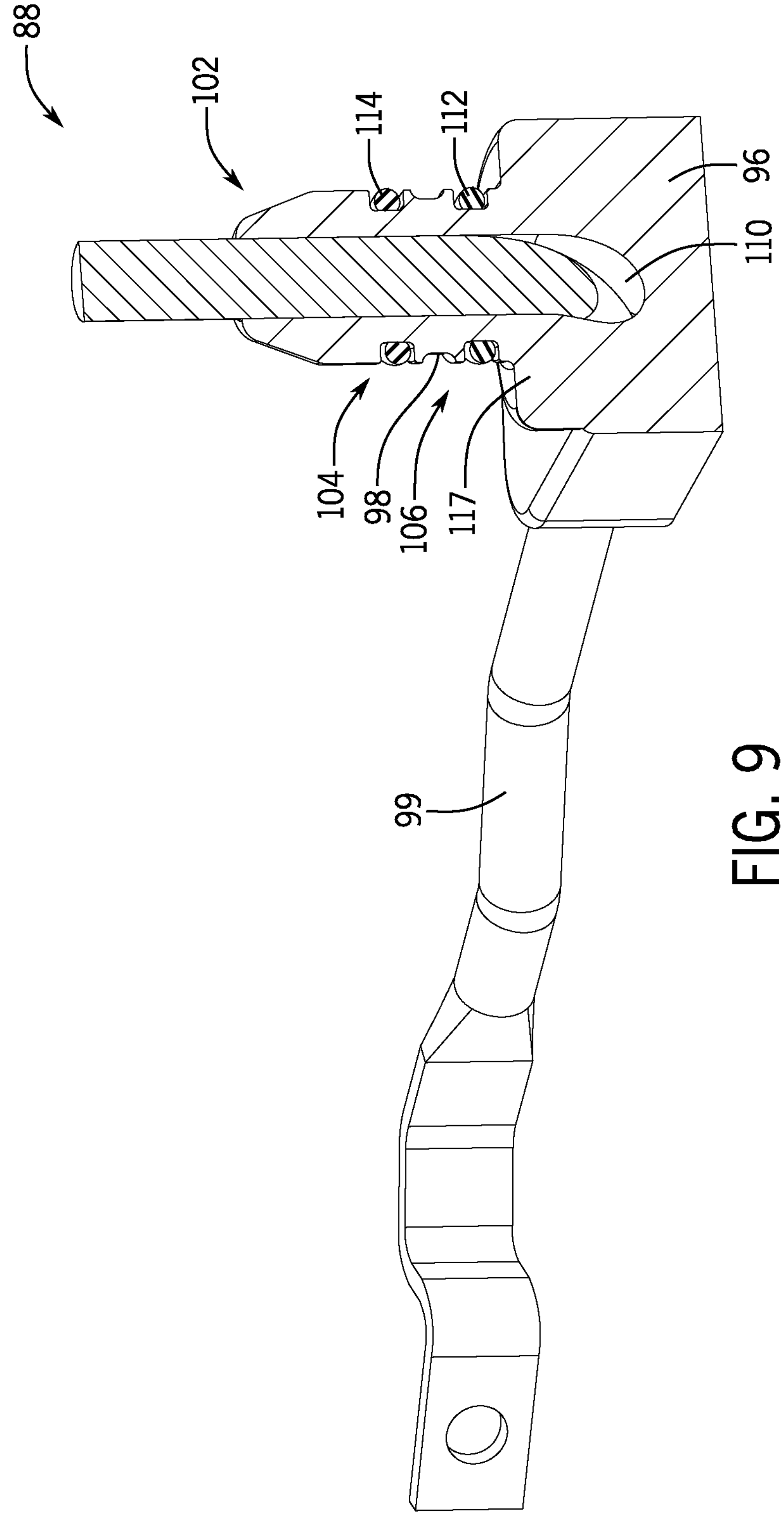
FIG. 9 is a cross-section view of an example inter-housing barrier in combination with a bus bar.

FIGS. 4-6B collectively illustrate the inter-housing barrier 37 as located between the first and second enclosures 30 and 32 to insulate the bus bar 34 and sealingly protect each of the e-machine 22 and the inverter 24. The inter-housing barrier 37 includes a flange 70 that abuts the aperture 64 of the second enclosure 32 and an engagement interface 72 that is inserted into the aperture 56 of the first enclosure 30. FIG. 6 illustrates a perspective view of the inter-housing barrier 37, illustrating the flange 70 and engagement interface 72. In one configuration, the engagement interface 72 extends orthogonally to the flange 70.

When the flange 70 abuts an outer surface of the second enclosure 32, gaskets, such as a gasket 78 enhance the seal between the flange 70 and the sidewall 62. The gasket 78 can fit within a groove 74 (see FIG. 6B). The flange 70 can also include fastener apertures, such as fastener aperture 80. A fastener, such as a bolt (not shown), can be inserted through the fastener aperture 80 and threaded into the sidewall 62 to secure the flange 70 against the sidewall 62. The inter-housing barrier 37 could alternatively be secured to the first enclosure 30.

Turning to the engagement interface 72, each engagement interface is configured to be inserted into one of the apertures of the first enclosure 30. In some instances, each of the engagement interfaces has a tapered or frustoconical end 81 (see FIGS. 6A and 6B). Each of the engagement interfaces can also include a gasket, such as an O-ring 82 that is received within a circumferential groove 84 created along a body of engagement interface 72. Each engagement interface can include a gasket 4 and groove, or a plurality of gasket and grooves. The O-ring 82 creates a fluid-tight seal between the engagement interface 72 and the first enclosure 30. This fluid-tight seal protects the e-machine 22 and prevents fluids from entering or leaving the first enclosure 30. That is, the gaskets also seal the bus bar from environmental exposure while preventing fluid transfer between the first enclosure 30 and the second enclosure 32.

In one example design of the electric drive system 20, an approach has been implemented to accommodate the natural expansion and contraction of bus bars due to thermal fluctuations without compromising the integrity and performance of the system. This design focuses on the construction and composition of the engagement interfaces and the application of a liquid polymer 85.

As noted above, the engagement interface 72 is designed to surround a portion of the bus bar 34. The engagement interface 72 is configured to avoid direct contact with the bus bars, preventing physical stress and wear that could result from thermal expansion. By not touching the bus bar, the engagement interface permits unrestricted movement, allowing the bus bar 34 to expand and contract in response to temperature changes. This design is advantageous for maintaining the longevity and functionality of the bus bars, as it minimizes mechanical fatigue and potential failure points.

In one example, the engagement interface 72 surrounds a portion of the bus bar 34 in such a way that a void 86 is created between an inner sidewall of the engagement interface 72 and the outer surface of the bus bar 34. In some instances, the liquid polymer 85 is employed as a component in maintaining a fluid-tight seal around these engagement interfaces. The liquid polymer 85 can be injected into the voids that exist between the engagement interfaces and the bus bars. Upon curing, this liquid polymer 85 forms a durable, flexible seal that conforms to the voids, effectively encapsulating the bus bars. This seal serves multiple functions: it prevents the ingress of contaminants and moisture, which could otherwise lead to corrosion or electrical faults, and it maintains its integrity across the bus bars' thermal expansion and contraction cycles. 2

The application of liquid polymer 85 provides a seal that is both adaptive and resilient. Unlike rigid sealing solutions, the flexible nature of the cured polymer accommodates the movements of the bus bars without cracking or losing their sealing properties. This ensures that the seal remains intact and effective throughout the operational life of the system, enhancing the overall safety and efficiency of the electric drive system.

Referring now to FIGS. 7-10 that collectively illustrate another embodiment of an inter-housing barrier 88. As with the embodiments above, an inverter is mounted externally to an e-machine 90. In more detail, the e-machine 90 is located within a first enclosure 92. A second enclosure 94 that includes the electrical components of an inverter 95 and is positioned externally to the first enclosure 92.

The inter-housing barrier 88 is associated with a bus bar 99 that electrically couples the e-machine 90 and the inverter 95. The inter-housing barrier 88 is a plug having a stop 96 and a neck 98. The neck 98 is configured to be inserted into an aperture 100 the second enclosure 94 so that the stop 96 is placed against the second enclosure 94.

In some instances, the neck 98 is cylindrically shaped with a frustoconical end 102. The body of the neck 98 includes two circumferential grooves 104 and 106, one located proximate to the stop 96 and one distally towards the frustoconical end 102.

In contrast with the example above, the inter-housing barrier 88 does not contact the first enclosure 92, but seals the contents of the first enclosure 92 and the second enclosure 94, preventing the contents of the enclosures, such as fluids from mixing.

The inter-housing barrier 88 encloses a portion of the bus bar 99 and can be configured similarly to an engagement interface of the embodiments above. That is, the inter-housing barrier 88 includes an injectable polymer that fills a void 110 inside the inter-housing barrier 88.

In this embodiment, the use of the injectable polymer plays a role in enhancing the structural and functional integrity of the electrical connections between the e-machine 90 and the inverter 95. This polymer is designed to be injected into the void around the bus bar 99 and within the inter-housing barrier 88.

Upon injection, the polymer fills the void around the neck 98 of the inter-housing barrier. The polymer's presence helps mitigate any potential micro-movements or vibrations that could disrupt electrical connectivity, especially under dynamic conditions such as vehicle motion or thermal expansion and contraction.

Moreover, the polymer is selected for its insulating properties, which contribute significantly to the electrical safety of the assembly. Forming a continuous, non-conductive barrier around the bus bar 99, prevents any possibility of electrical shorts between the bus bar and the metallic parts of the enclosure. This is particularly important in environments where moisture or other conductive contaminants might be present.

The injectable polymer is also designed to withstand the thermal stresses associated with the operation of high-power electrical components. It maintains its physical and chemical properties across a wide range of temperatures, ensuring that its insulating and sealing capabilities are not compromised over time. This durability is crucial for maintaining long-term reliability and performance of the electric drive system, minimizing maintenance needs and enhancing the overall lifecycle of the 18 vehicle's powertrain components. 19

In one embodiment, the inter-housing barrier 88 includes gaskets 112 and 114 that are associated with the circumferential grooves 104 and 106, respectively. The gaskets 112 and 114 create a seal when the inter-housing barrier 88 is inserted into the aperture 100 the second enclosure 94. The gaskets 112 and 114 contact the inner sidewalls that define the aperture 100. When inserted, the stop 96 engages with an outer surface of the second enclosure 94, around the periphery of the aperture 100. In some instances, the stop 96 includes an elongated base 117 that extends orthogonally 26 to the neck 98.

Figure 10:
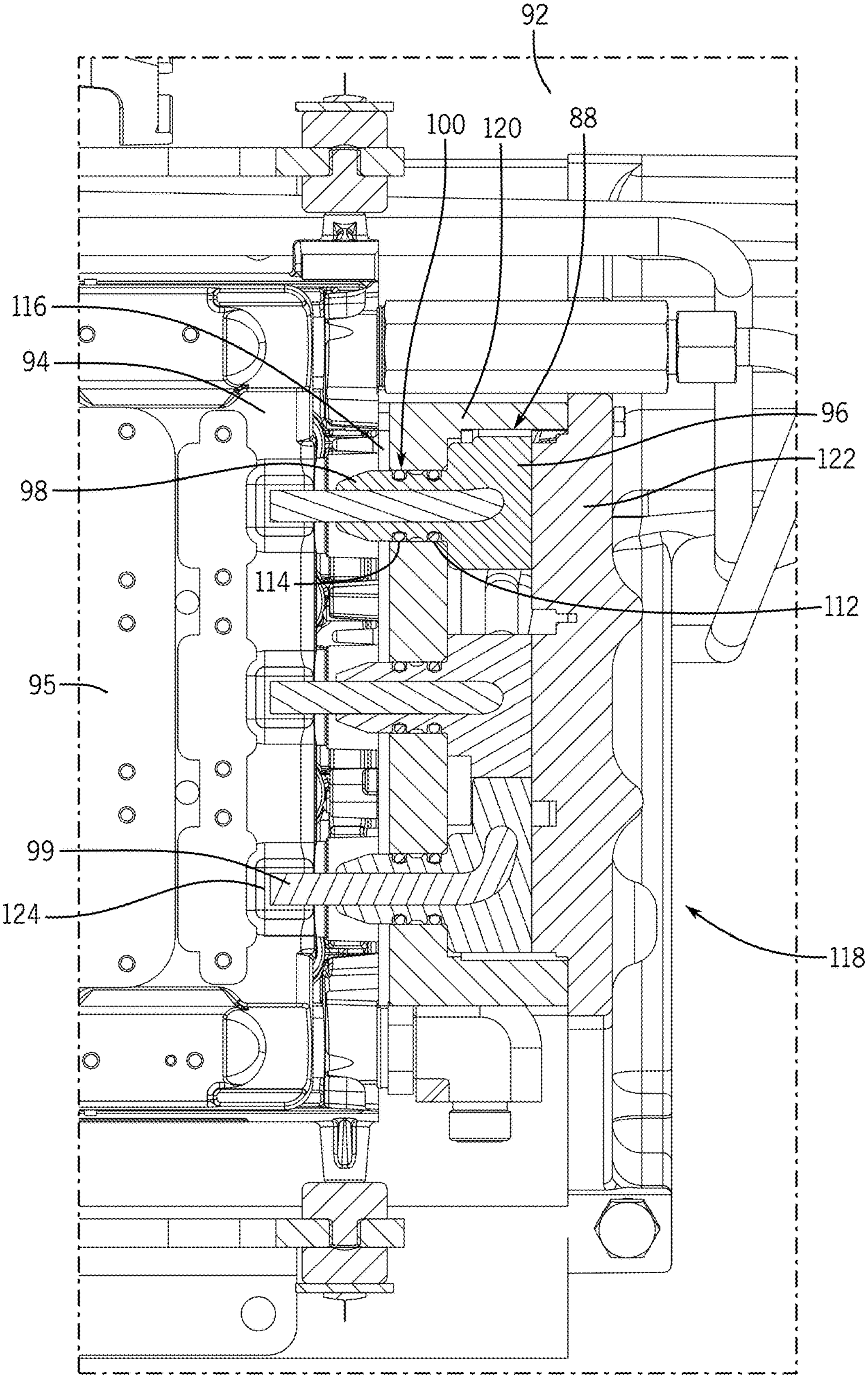
FIG. 10 is a cross-sectional view of an inter-housing barrier for protecting and securing a bus bar spanning between an e-machine and inverter.

FIG. 10 is a cross-sectional view of inter-housing barrier 88 in an installed configuration. The inter-housing barrier 88 is positioned between the first enclosure 92 and the second enclosure 94. In this instance, the inter-housing barrier 88 seals the aperture 100 of the second enclosure 94 when the neck 98 is inserted into the aperture 100. Again, the aperture 100 is formed from voids in a sidewall 116 of the second enclosure 94. In this implementation, the second enclosure 94 includes three apertures, corresponding to three bus bar connections. In some instances, internal enclosure 118 of the first enclosure 92 can mate with a sidewall 116 of the second enclosure 94. The internal enclosure 118 includes a base 120 and a cover 122. The base 120 contacts the sidewall 116 of the second enclosure 94. The inter-housing barrier 88 is located with the internal enclosure 118.

In some instances, the cover 122 pushes the inter-housing barrier 88 into the base 120 and the aperture 100 of the sidewall 116 of the second enclosure 94. This compression occurs when the internal enclosure 118 is secured to the second enclosure 94 with bolts or other fasteners. In more detail, when the cover 122 is secured to the base 120, the inter-housing barrier 88 is captured inside the internal enclosure 118. Tightening of the bolts draws the cover 122 onto the base 120, and the base 120 against the sidewall 116.

In some implementations, the stop 96 is located between the base 120 and the cover 122 of the internal enclosure 118. To be sure, this configuration allows the inverter to remain external to the first enclosure 92, such that the inverter is accessible without having to disturb any of the components in the first enclosure 92, namely the e-machine 90

The bus bar 99 extends through the inter-housing barrier 88 to connect with an electrical contact 124 of the inverter 95. The opposing end of the bus bar 99 electrically couples with the e-machine, either directly or indirectly (see FIG. 7). As noted above, the gaskets 112 and 114 complete the seal between the second enclosure 94 and the first enclosure 92.

Figure 11:
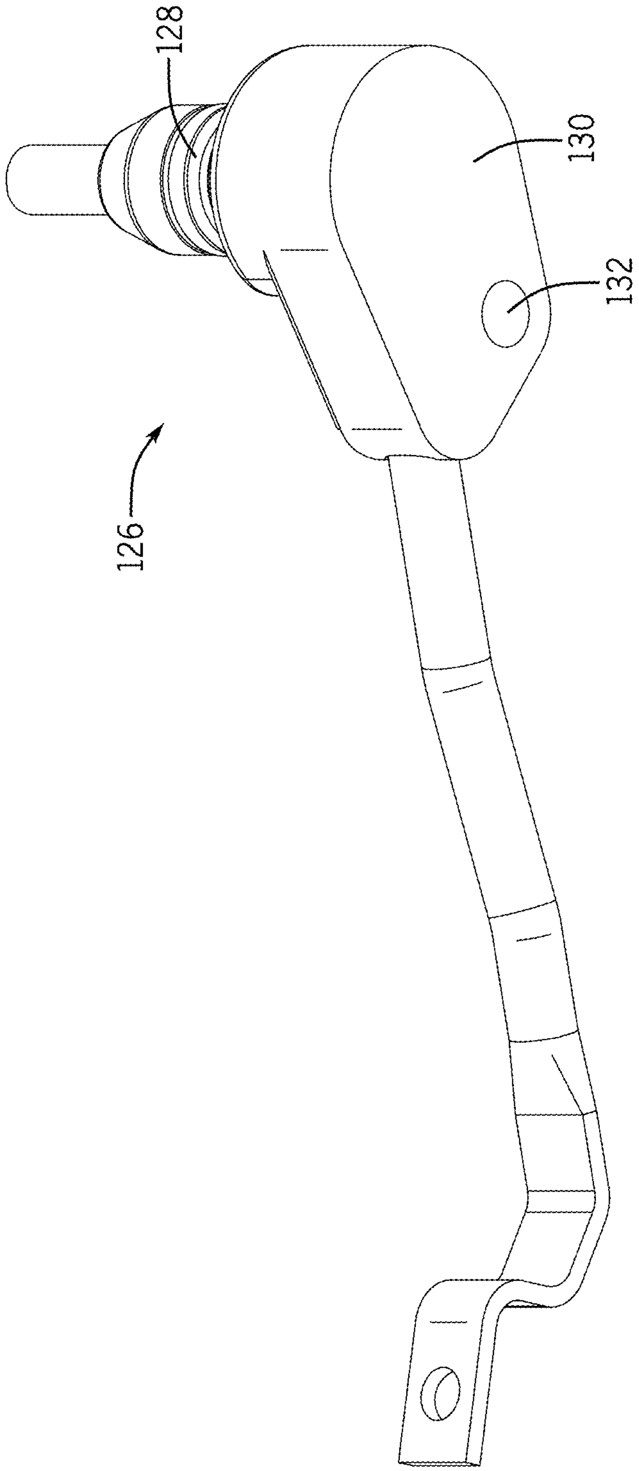
FIG. 11 is a perspective view of another example inter-housing barrier for protecting and securing a bus bar spanning between an e-machine and inverter.

FIG. 11 is a perspective view of another example of inter-housing barrier 126, constructed similarly to the inter-housing barrier 88 of FIGS. 7-10, with the exception that the inter-housing barrier 126 includes only a single gasket 128. Also, the elongated base 130 includes an aperture 132 that receives a fastener (not shown) for securing the inter-housing barrier 126 to a structure, such as the second enclosure 94 illustrated in FIG. 10. In other implementations, the aperture 132 could be used as a pass-through for other electrical drive components such as a wire, a cable, a bus bar, a structure component, and so forth.

CONCLUSION

This disclosure has outlined electric drive systems with integrated bus bars and inter-housing barriers, tailored for work vehicles. The presented electric drive systems not only optimize power transmission efficiency but also address significant challenges in maintenance and operational durability. The integration of bus bars with inter-housing barriers ensures a robust, fluid-tight connection between different enclosures, effectively preventing fluid leakage and contamination, which is an advancement for maintaining component integrity in harsh working conditions. Additionally, the system's design facilitates easier access and serviceability, significantly reducing downtime and operational costs. These features collectively contribute to a more reliable and efficient electric drive system, thereby supporting the continuous operation and longevity of work vehicles in demanding environments.

As utilized herein, unless otherwise limited or modified, lists with elements that are separated by conjunctive terms (e.g., "and") and that is also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An electric drive system for a work vehicle, the electric drive system comprising:

an electric machine of the electric drive system;

an inverter for providing power to the electric machine of the electric drive system;

a bus bar electrically coupling a first electrical conductor of the electric machine to a second electrical conductor of the inverter, wherein the bus bar has a first end coupled to the first electrical conductor and a second end coupled to the second electrical conductor, the first electrical conductor located within a first enclosure and the inverter located within a second enclosure;

an inter-housing barrier positioned between the first enclosure and the second enclosure, wherein the inter-housing barrier surrounds a segment of the bus bar and is configured to provide a fluid-tight seal that prevents fluid transfer between the first and second enclosures; and a liquid polymer that is injected between the inter-housing barrier and the bus bar.

2. The electric drive system according to claim 1, wherein the first enclosure includes a first fluid and the second enclosure includes a second fluid, the first fluid and the second fluid being immiscible.

3. The electric drive system according to claim 1, further comprising a gasket that seals the electric machine and the inverter from environmental exposure and prevents fluid transfer between the first enclosure and the second enclosure.

4. An electric drive system for a work vehicle, the electric drive system comprising:

an electric machine of the electric drive system;

an inverter for providing power to the electric machine of the electric drive system;

a bus bar electrically coupling a first electrical conductor of the electric machine to a second electrical conductor of the inverter, wherein the bus bar has a first end coupled to the first electrical conductor and a second end coupled to the second electrical conductor, the first electrical conductor located within a first enclosure and the inverter located within a second enclosure;

an inter-housing barrier positioned between the first enclosure and the second enclosure, wherein the inter-housing barrier surrounds a segment of the bus bar and is configured to provide a fluid-tight seal that prevents fluid transfer between the first and second enclosures, wherein the inter-housing barrier includes a flange that abuts an aperture of the second enclosure and an engagement interface that is inserted into an aperture of the first enclosure; and a first enclosure gasket positioned between the engagement interface and the aperture of the first enclosure, and a second enclosure gasket interposed between the flange of the inter-housing barrier and the aperture of the second enclosure.

5. The electric drive system according to claim 4, wherein the flange is configured to be secured to the first or second enclosure.

6. An electric drive system for a work vehicle, the electric drive system comprising:

an electric machine of the electric drive system;

an inverter for providing power to the electric machine of the electric drive system;

a bus bar electrically coupling a first electrical conductor of the electric machine to a second electrical conductor of the inverter, wherein the bus bar has a first end coupled to the first electrical conductor and a second end coupled to the second electrical conductor, the first electrical conductor located within a first enclosure and the inverter located within a second enclosure;

an inter-housing barrier positioned between the first enclosure and the second enclosure, wherein the inter-housing barrier surrounds a segment of the bus bar and is configured to provide a fluid-tight seal that prevents fluid transfer between the first and second enclosures, wherein the inter-housing barrier is a plug having a stop and a neck, wherein the neck is configured to be inserted into an aperture of either the first or second enclosure, and the stop is placed against the first or second enclosure.

7. The electric drive system according to claim 6, further comprising a gasket disposed on the neck, the gasket preventing fluid transfer between the first and second enclosures.

8. A work vehicle having an electric drive system, the work vehicle comprising:

an electric machine housed within a first enclosure containing a first fluid, the electric machine including first electrical conductors;

an inverter externally mounted relative to the electric machine and housed within a second enclosure containing a second fluid, the inverter including second electrical conductors; and a bus bar assembly comprising:

bus bars electrically coupling the first electrical conductors of the electric machine to the second electrical conductors of the inverter;

inter-housing barriers positioned between the first enclosure and the second enclosure, wherein the inter-housing barriers surround a segment of each of the bus bars and provide a fluid-tight seal preventing transfer of the first fluid into the second enclosure and the second fluid into the first enclosure; wherein the inter-housing barriers each include a flange that abuts an aperture of the second enclosure and an engagement interface that is inserted into an aperture of the first enclosure; and first enclosure gaskets positioned between engagement interfaces of the inter-housing barriers and the apertures of the first enclosure, and second enclosure gaskets interposed between each of the flanges of the inter-housing barriers and the apertures of the second enclosure.

9. The work vehicle according to claim 8, wherein the electric machine is integrated within a transmission housing containing a transmission fluid as the first fluid, and the inverter is housed within a second enclosure containing water as a cooling fluid, wherein the inter-housing barrier provides a sealing interface that prevents the transmission fluid from mixing with the water.

10. The work vehicle according to claim 8, wherein the flange is configured to be secured to the first or second enclosure.

11. The work vehicle according to claim 10, wherein the engagement interfaces surround, without contacting, the bus bars and a liquid polymer that is injected inside voids between the engagement interfaces and the bus bars, to allow the bus bars to expand and contract without compromising the fluid-tight seal.

12. The work vehicle according to claim 8, wherein the first enclosure includes a first fluid and the second enclosure includes a second fluid, the first fluid and the second fluid being immiscible.

13. The work vehicle according to claim 8, wherein the inter-housing barriers are constructed from a high-temperature resistant material capable of elastic deformation.

14. A work vehicle having an electric drive system, the work vehicle comprising:

an electric machine housed within a first enclosure containing a first fluid, the electric machine including first electrical conductors;

an inverter externally mounted relative to the electric machine and housed within a second enclosure containing a second fluid, the inverter including second electrical conductors; and a bus bar assembly comprising:

bus bars electrically coupling the first electrical conductors of the electric machine to the second electrical conductors of the inverter; and inter-housing barriers positioned between the first enclosure and the second enclosure, wherein the inter-housing barriers surround a segment of each of the bus bars and provide a fluid-tight seal preventing transfer of the first fluid into the second enclosure and the second fluid into the first enclosure, wherein the inter-housing barriers comprise a plurality of plugs each being associated with one of the bus bars, each of the plugs having a stop and a neck, the neck is configured to be inserted into an aperture of either the first or second enclosure, and the stop abuts the first or second enclosure.

15. The work vehicle according to claim 14, further comprising a gasket disposed on the neck, the gasket preventing fluid transfer between the first and second enclosures.

16. The work vehicle according to claim 15, wherein the neck has a frustoconical terminal end that is adapted for insertion into an aperture of the first or second enclosures.

* * * * *